United States Patent
Huh et al.

(10) Patent No.: US 10,191,351 B2
(45) Date of Patent: Jan. 29, 2019

(54) LENS PANEL AND DISPLAY DEVICE INCLUDING THE SAME

(71) Applicant: SAMSUNG DISPLAY CO., LTD., Yongin-si, Gyeonggi-do (KR)

(72) Inventors: Su Jung Huh, Yongin-si (KR); Jae Joong Kwon, Suwon-si (KR); Beom Shik Kim, Yongin-si (KR); Yi Joon Ahn, Seoul (KR); Yeon-Mun Jeon, Hwaseong-si (KR); Joo Woan Cho, Seongnam-si (KR)

(73) Assignee: SAMSUNG DISPLAY CO., LTD., Yongin-Si, Gyeonggi-Do (KR)

(*) Notice: Subject to any disclaimer, the term of this patent is extended or adjusted under 35 U.S.C. 154(b) by 0 days.

(21) Appl. No.: 15/690,501

(22) Filed: Aug. 30, 2017

(65) Prior Publication Data
US 2018/0120668 A1    May 3, 2018

(30) Foreign Application Priority Data
Oct. 27, 2016    (KR) .................. 10-2016-0140975

(51) Int. Cl.
  *G02F 1/1347* (2006.01)
  *G02F 1/29* (2006.01)
  *G02B 27/22* (2018.01)
  *G02B 3/14* (2006.01)

(52) U.S. Cl.
  CPC ............. *G02F 1/29* (2013.01); *G02B 27/225* (2013.01); *G02B 3/14* (2013.01); *G02F 2201/122* (2013.01)

(58) Field of Classification Search
  CPC ....................... G02F 1/1347; G02F 1/13471
  See application file for complete search history.

(56) References Cited

U.S. PATENT DOCUMENTS

| | | |
|---|---|---|
| 2016/0011429 A1 | 1/2016 | Vdovin et al. |
| 2016/0073088 A1 | 3/2016 | Cohen et al. |
| 2016/0191768 A1 | 6/2016 | Shin et al. |
| 2018/0088418 A1* | 3/2018 | Huh ............... G02F 1/134336 |

FOREIGN PATENT DOCUMENTS

| | | |
|---|---|---|
| JP | 3016744 | 12/1999 |
| KR | 10-2013-0092005 | 8/2013 |
| KR | 10-2015-0118013 | 10/2015 |
| KR | 10-2016-0039533 | 4/2016 |

* cited by examiner

*Primary Examiner* — Phu Vu
(74) *Attorney, Agent, or Firm* — F. Chau & Associates, LLC

(57) ABSTRACT

A display device includes a display panel including a plurality of pixels configured to display an image, and a lens panel disposed on the display panel and including a plurality of lenses when operating in a 3D mode. The lens panel is partitioned into a plurality of domains. The lens panel includes a first electrode, a second electrode, and an optical modulation layer. The first electrode and the second electrode face each other and the optical modulation layer is disposed between the first electrode and the second electrode. The optical modulation layer includes liquid crystal molecules forming the lenses. The first electrode includes first openings and the second electrode includes second openings. At least one of a first opening, of the first openings, and a second opening, of the second openings, has a shape corresponding to a shape of a plurality of unit figures overlapping each other at their edges.

20 Claims, 16 Drawing Sheets

LENS PANEL AND DISPLAY DEVICE INCLUDING THE SAME

CROSS-REFERENCE TO RELATED APPLICATION

This application claims priority under 35 U.S.C. § 119 to Korean Patent Application No. 10-2016-0140975 filed on Oct. 27, 2016 in the Korean Intellectual Property Office, the disclosure of which is incorporated by reference herein in its entirety.

TECHNICAL FIELD

The present invention relates to a lens, and more particularly, to a lens panel and a display device including the lens panel.

DISCUSSION OF THE RELATED ART

Recently, with continuing development of a three-dimensional (3D) display device technology, various 3D image display devices have been researched. A method for displaying a 3D image (also referred to as a stereoscopic image) may include using binocular disparity for recognition of a stereoscopic effect. In binocular disparity, different 2D images are reflected to the left eye and the right eye, and when the image reflected to the left eye (hereafter referred to as "left eye image") and the image reflected to the right eye (hereafter referred to as "right eye image") are transferred to the brain, the left eye image and the right eye image are converged in the brain and recognized as a 3D image having depth.

A 3D image display device can be classified into several types, for example, a stereoscopic 3D image display device and an auto-stereoscopic 3D image display device. For the stereoscopic 3D image display device to display a 3D image, 3D glasses must be worn. On the other hand, the auto-stereoscopic 3D image display device does not require the use of 3D glasses to display a 3D image.

The auto-stereoscopic 3D image display device can be classified into a multi-viewpoint type and a super multi-viewpoint type that enable viewing of a stereoscopic image without the use of 3D glasses at a specific viewing angle, an integral image type, a volumetric image type, and a hologram type that provide a stereoscopic image at various angles. The multi-viewpoint type can be classified into a spatial type that realizes a required number of viewpoints by spatially dividing the entire resolution using a lens array and the like, and a temporal type that displays images of several viewpoints quickly in time while maintaining the entire resolution of the image. The integral image type stores a basic image, which is an image of 3D image information photographed with a limited size in slightly different directions, and then the basic image is displayed through the lens array such that a viewer can recognize the image as a 3D image.

SUMMARY

According to an exemplary embodiment of the present invention, a display device includes a display panel including a plurality of pixels configured to display an image, and a lens panel disposed on the display panel and including a plurality of lenses when operating in a 3D mode. The lens panel is partitioned into a plurality of domains. The lens panel includes a first electrode, a second electrode, and an optical modulation layer. The first electrode and the second electrode face each other and the optical modulation layer is disposed between the first electrode and the second electrode. The optical modulation layer includes liquid crystal molecules forming the lenses. The first electrode includes first openings and the second electrode includes second openings. At least one of a first opening, of the first openings, and a second opening, of the second openings, has a shape corresponding to a shape of a plurality of unit figures overlapping each other at their edges.

In an exemplary embodiment of the present invention, the first opening and the second opening overlap each other at their edges.

In an exemplary embodiment of the present invention, the first opening and the second opening do not overlap each other.

In an exemplary embodiment of the present invention, each of the plurality of unit figures has a circular shape.

In an exemplary embodiment of the present invention, each of the plurality of domains has a polygonal shape, and each of the plurality of domains is disposed in each of the plurality of unit figures.

In an exemplary embodiment of the present invention, each of the plurality of domains has a hexagonal shape.

In an exemplary embodiment of the present invention, the first openings are disposed in a first direction, and each of the first openings and each of the second openings are alternately arranged with respect to each other along a second direction that crosses the first direction.

In an exemplary embodiment of the present invention, the lens panel further includes a first resistive layer that is disposed between the first electrode and the optical modulation layer.

In an exemplary embodiment of the present invention, the lens panel further includes a second resistive layer that is disposed between the second electrode and the optical modulation layer.

In an exemplary embodiment of the present invention, the first resistive layer at least partially covers the first electrode.

According to an exemplary embodiment of the present invention, a display device includes a display panel including a plurality of pixels that are configured to display an image, and a lens panel that is disposed on the display panel and includes a plurality of lenses when operating in a 3D mode. The lens panel is partitioned into a plurality of domains. The lens panel includes a first electrode including first openings, a second electrode facing the first electrode and including second openings, an optical modulation layer disposed between the first electrode and the second electrode and including liquid crystal molecules forming the lenses, and a first resistive layer disposed between the first electrode and the optical modulation layer.

In an exemplary embodiment of the present invention, the lens panel further includes a first alignment layer that is disposed between the first resistive layer and the optical modulation layer.

In an exemplary embodiment of the present invention, the lens panel further includes a second resistive layer that is disposed between the second electrode and the optical modulation layer.

In an exemplary embodiment of the present invention, the lens panel further includes a second alignment layer that is disposed between the second resistive layer and the optical modulation layer.

In an exemplary embodiment of the present invention, the first resistive layer at least partially covers the first electrode.

In an exemplary embodiment of the present invention, at least one of a first opening, of the first openings, and the second opening, of the second openings, has a shape corresponding to a shape of a plurality of unit figures overlapping each other at their edges.

In an exemplary embodiment of the present invention, the first openings and the second openings overlap each other at their edges.

In an exemplary embodiment of the present invention, the first openings and the second openings do not overlap each other.

In an exemplary embodiment of the present invention, each of the unit figures has a circular shape.

In an exemplary embodiment of the present invention, each of the domains has a polygonal shape and is disposed in each of the unit figures.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawing, wherein.

DETAILED DESCRIPTION OF THE EMBODIMENTS

Figure 1:
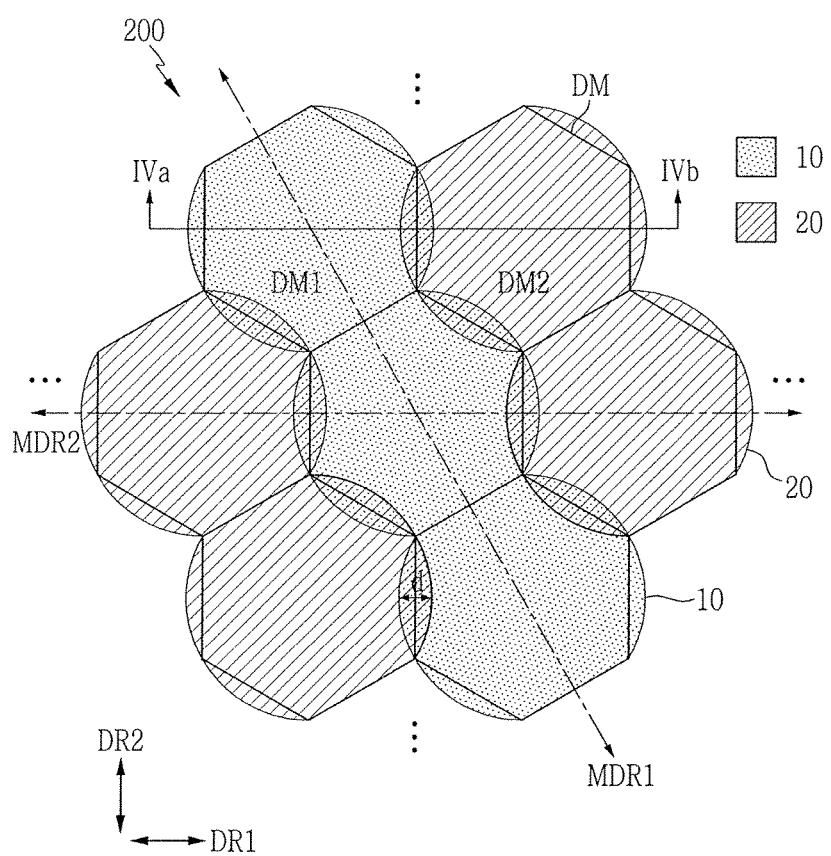
FIG. 1 is a top plan view illustrating a lens panel according to an exemplary embodiment of the present invention.

Exemplary embodiments of the present invention will be described more fully hereinafter with reference to the accompanying drawings.

It will be understood that the drawings and following description are to be regarded as illustrative in nature. In the figures, like reference numerals may denote like elements or features, and thus their descriptions may be omitted.

In the drawings, sizes of elements and/or components in the drawings may be exaggerated for clarity.

It will be understood that when an element such as a layer, film, region, or substrate is referred to as being "on" another element, it can be directly on the other element or intervening elements may also be present.

Referring to FIG. 1 to FIG. 5, a lens panel according to an exemplary embodiment of the present invention will be described.

Figure 2:
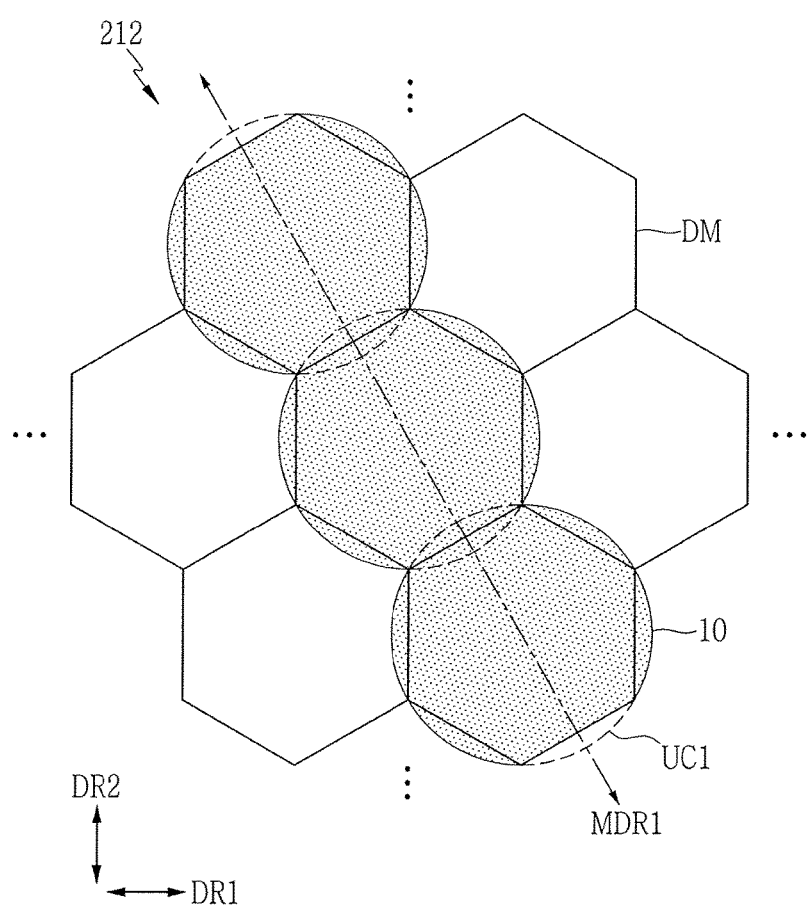
FIG. 2 is a top plan view illustrating one electrode unit included in the lens panel of FIG. 1 according to an exemplary embodiment of the present invention.
Figure 3:
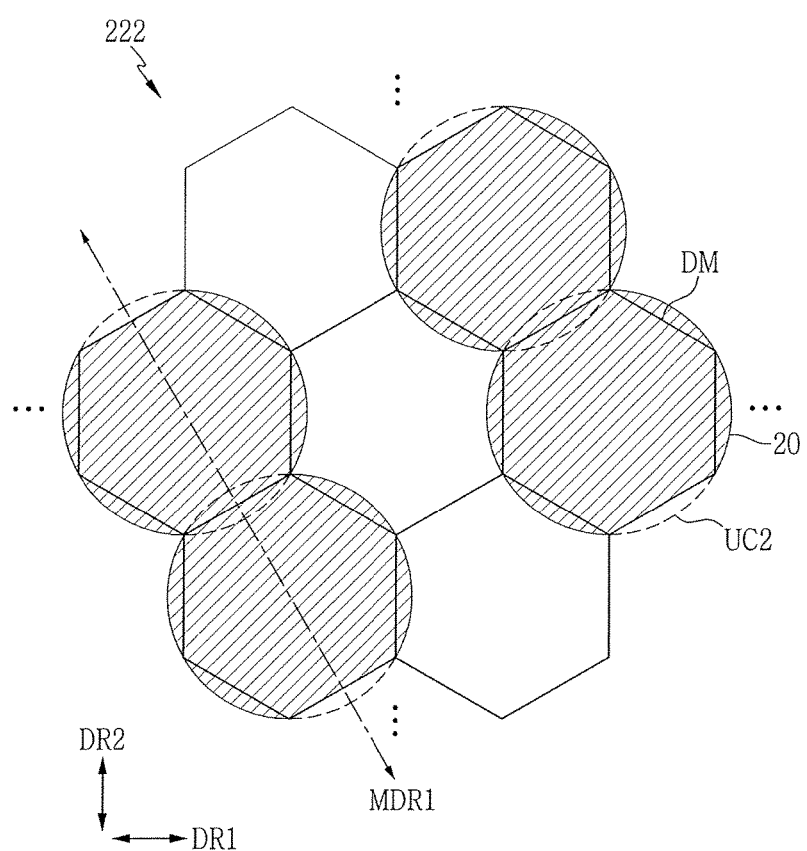
FIG. 3 is a top plan view of an electrode unit included in the lens panel of FIG. 1 according to an exemplary embodiment of the present invention.
Figure 4:
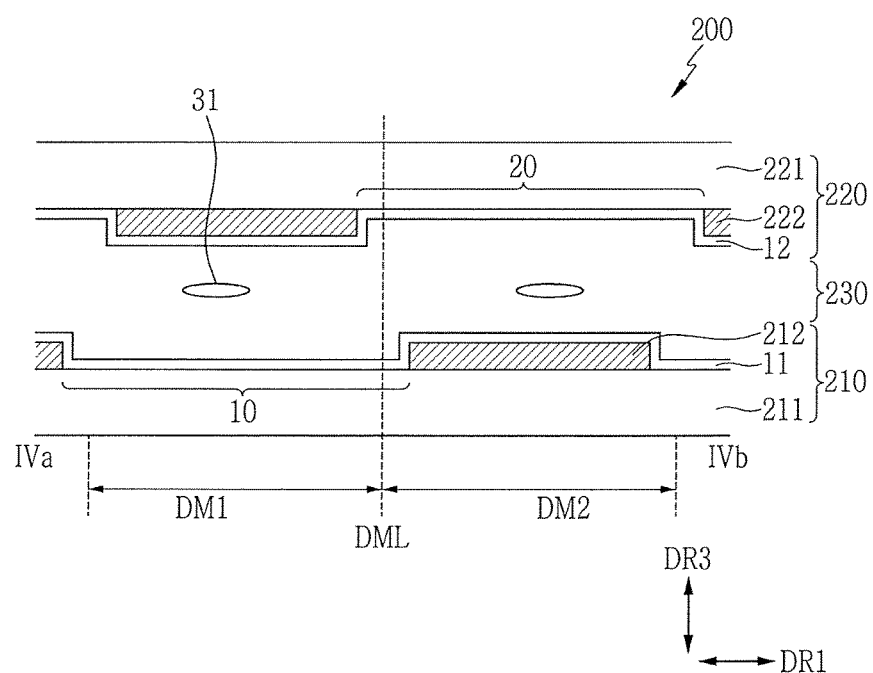
FIG. 4 and FIG. 5 are cross-sectional views of the lens panel of FIG. 1, taken along the line IVa-IVb, and each respectively shows different modes, according to an exemplary embodiment of the present invention.
Figure 5:
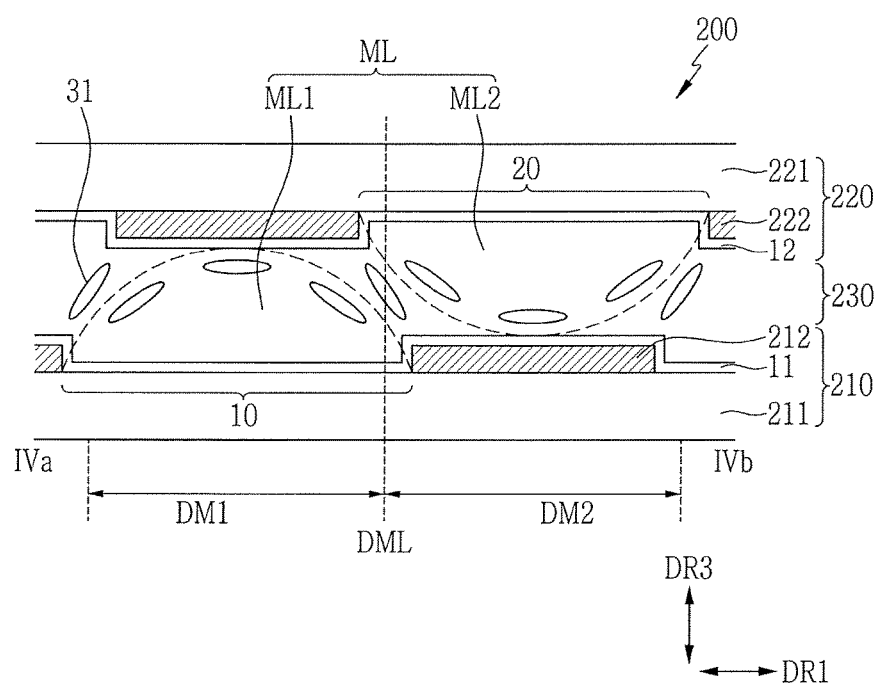

FIG. 1 is a top plan view illustrating a lens panel according to an exemplary embodiment of the present invention. FIG. 2 is a top plan view illustrating one electrode portion included in the lens panel of FIG. 1 according to an exemplary embodiment of the present invention. FIG. 3 is a top plan view of an electrode portion included in the lens panel of FIG. 1 according to an exemplary embodiment of the present invention. FIG. 4 and FIG. 5 are cross-sectional views of the lens panel of FIG. 1, taken along the line IVa-IVb, and each respectively show different modes, according to an exemplary embodiment of the present invention.

Referring to FIG. 1 to FIG. 5, a lens panel 200, according to an exemplary embodiment of the present invention, includes a first electrode unit 210, a second electrode unit 220, and an optical modulation layer 230. The first electrode unit 210 and the second electrode unit 220 face each other in a sectional view, and the optical modulation layer 230 is disposed between the first electrode unit 210 and the second electrode unit 220. The lens panel 200 may extend in a first direction DR1 and a second direction DR2, but the present invention is not limited thereto. The lens panel 200 may form a curved surface of which a degree of curvature is greater than zero. This may be changed depending on a method or a type of 3D image display device in which the lens panel is used in.

A part or the entire area of the lens panel 200 may be partitioned into a plurality of domains DM. Each domain DM may have a polygonal shape, and may be a small convex polygon of which all internal angles are smaller than 180°. For example, each domain DM may have the shape of a hexagon, but the present invention is not limited thereto. Each domain DM may have the shape of a quadrangle, a pentagon, and the like. Two adjacent domains DM may shape one side of the lens panel 200.

As shown in the drawings (e.g., FIG. 1 to FIG. 3), a domain DM may be formed in the shape of a regular polygon, and thus sides of each domain DM may have the same length, but the present invention is not limited thereto. For example, the sides of each of the domains DM may be different from each other. In a plan view, a length of one side of the domain DM in one direction may be longer than a length of another side of the domain DM in another direction.

The domains DM included in the lens panel 200 may have substantially constant sizes and shapes, but the lens panel 200 may include domains DM having different shapes depending on a location. In addition, the shape of each domain DM is not limited to a polygonal shape. The shape of the domain DM may include a circular shape or an oval shape. The shapes of the domains DM included in the lens panel 200 may be different from each other depending on their respective locations. For example, the lens panel 200 may include domains DM with hexagonal shapes and octagonal shapes.

The first electrode unit 210 and the second electrode unit 220 may be formed in the shape of a plate or a film having a main side that extends into first direction DR1 and the second direction DR2, but the present invention is not limited thereto. For example, the first electrode unit 210 and the second electrode unit 220 may be formed in the shape of a curved plate or film.

Referring to FIG. 4 and FIG. 5, the first electrode unit 210 includes a first substrate 211 and at least one first electrode 212, and the second electrode unit 220 includes a second substrate 221 and at least one second electrode 222. The first electrode 212 and the second electrode 222 may be separated from each other, and the optical modulation layer 230 may be disposed therebetween. For example, the first electrode 212 and the second electrode 222 may face each other. The first electrode 212 and the second electrode 222 may be formed of a transparent conductive material such as indium tin oxide, zinc tin oxide, or the like.

The first electrode 212 includes a first opening 10 and the second electrode 222 includes a second opening 20. The opening (e.g., 10 or 20) may be an area where an electrode (e.g., 212 or 222) is at least partially removed in a plan view.

Referring to FIG. 2, the first opening 10 has a shape that is similar to a shape formed by circles overlapping each other. For example, the circles may overlap each other along their edges. As an additional example, the shape of the first opening 10 may be substantially the same as a shape formed by circles with an empty interior partially overlapping each other. Referring to FIG. 3, like the first opening 10, the second opening 20 has a shape that is similar to a shape formed by circles overlapping each other. Virtual overlapped portions of the circles are shown by dotted lines in FIG. 2 and FIG. 3. Hereinafter, circles that limit the first opening 10 will be respectively referred to as first unit circles CU1, and circles that limit the second opening 20 will be respectively referred to as second unit circles UC2.

In the areas shown in FIG. 2 and FIG. 3, the first opening 10 includes three first unit circles UC1, and the second openings 20 that are disposed at lateral sides of the first opening 10 include two unit circles UC2. The first opening 10 and the second opening 20 are denoted as solid lines, and each of the first unit circles UC1 and each of the second unit circles UC2 are denoted as a combination of solid lines and dotted lines. The first unit circle UC1 and the second unit circle UC2 may be substantially the same size as each other or may have different sizes from each other. The largest width of the first opening 10 may be the same as a diameter of the first unit circle UC1, and the smallest width of the first opening 10 may be the same as a length of a line (e.g., corresponds to one side of the domain DM in FIG. 2) that connects points of intersections of adjacent first unit circles UC1. For example, the points of intersections of adjacent first unit circles UC1 is formed from the intersection of outer boundary lines of each first unit circle UC1. Likewise, the largest width of the second opening 20 may be the same as a diameter of the second unit circle UC2, and the smallest width of the second opening 20 may be the same as a length of a line that connects points of intersections of adjacent unit circles UC2.

As shown in FIG. 1 to FIG. 3, the first opening 10 may be substantially formed in a first domain direction MDR1. The second opening 20 may be formed in the first domain direction MDR1. Here, the domain direction is a direction in which continuously adjacent domains DM are arranged, and the first domain direction MDR1 may be one of a plurality of directions in which continuously adjacent domains DM are arranged. The first openings 10 and the second openings 20 may be alternately arranged in the second domain direction MDR2.

A unit figure may be a shape, and the shape of the openings 10 and 20 may correspond to a shape of a plurality of unit figures. For example, the plurality of unit figures may be overlapping each other, but the present invention is not limited thereto. As an additional example, the unit figure may be a circular shape as shown in FIGS. 1 through 3, but the present invention is not limited thereto. For example, the unit figure may have a shape of an oval or a polygon, for example, a hexagon. When the unit figure has the shape of a hexagon, the unit figure may substantially match the shape of the domain DM. In addition, when edges of the hexagonal unit figures contact each other rather than overlapping each other, the openings 10 and 20 may substantially match the shape of the domains DM that are not blocked in the first domain direction MDR1.

The first openings 10 included in the first electrode 212 may have substantially constant sizes and shapes, and the second openings 20 included in the second electrode 222 may have substantially constant sizes and shapes, but the present invention is not limited thereto. For example, the first electrode 212 may include first openings 10 of which shapes are different from each other depending on their locations, and the second electrodes 222 may include second openings 20 of which shapes are different from each other depending on their locations.

A width of the first opening 10 and a width of the second opening 20 may be approximately 100 micrometers or less, but the present invention is not limited thereto. The size of the first opening 10 and the size of the second opening 20 may be decreased as a resolution of the lens panel 200 is increased.

In each domain DM, one of the first opening 10 and the second opening 20 is provided and an edge portion of the other is also provided. In a plan view, each domain DM may overlap either the first unit circles UC1 of the first opening 10 or the second unit circles UC2 of the second opening 20. For example, in a plan view, a center of each domain DM may approximately match a center of each of the first and second unit circles UC1 and UC2 of the first opening 10 and the second opening 20, respectively. Here, the center of each domain may be a center of gravity of the domain DM, but the present invention is not limited thereto. The center of each domain may be located at various points of a domain DM. For example, in a case where the domain DM has a symmetrical shape, a point of intersection of two or more lines (e.g., imaginary lines) extending from one side of the symmetrical shape to another side of the symmetrical shape.

Each domain DM may be disposed in the first unit circle UC1 or the second unit circle UC2. The unit circles UC1 and UC2 may partially extend outside of the corresponding domain DM. Each domain DM may be substantially the same as a figure that is formed by connecting points of intersections of unit circles UC1 and UC2 that limit the first opening 10 and the second opening 20. For example, in the seven domains DM shown in FIG. 1 to FIG. 3, a center domain DM is disposed in one first unit circle UC1 of the first opening 10 and surrounded by two first unit circles UC1 of the first opening 10 and four second unit circles UC2 of the second openings 20. The center domain DM may have a shape of a hexagon formed by lines that connect points of intersections of the first unit circle UC1 in the center and the six unit circles UC1 and UC2 that surround the first unit circle UC1 in the center.

In each domain DM, edges of the first unit circle UC1 of the first opening 10 overlap edges of the second unit circles UC2 of the second openings 20, and accordingly, the edge of the first opening 10 also overlaps the edges of the second openings 20. Accordingly, the first electrode 212 where the first openings 10 are formed and the second electrode 222 where the second openings 20 are formed are disposed apart from each other in a plan view, and a distance d between the first electrode 212 and the second electrode 222 may be approximately 5 micrometers or less, but the present invention is not limited thereto. Here, the distance d corresponds to a maximum width of edge portions of the first opening 10 and the second opening 20 that overlap each, and the distance d extends in the second domain direction MDR2 in FIG. 1.

Unlike the illustrated exemplary embodiment of the present invention, at least one of the unit circles UC1 and UC2 that limit the first opening 10 and the second opening 20 may be disposed or provided in each domain DM. Thus, each of the first unit circles UC1 may form the first opening 10, and each of the second unit circles UC2 may form the second opening 20.

According to an exemplary embodiment of the present invention, a second opening 20 may be substantially disposed in at least one of the domains DM, adjacent to one domain DM where a first opening 10 is substantially disposed. Similarly, a first opening 10 may be substantially disposed in at least one of the domains DM, adjacent to one domain DM where a second opening 20 is disposed. For example, referring to FIG. 1 to FIG. 5, among the domains DM of the lens panel 200, a first opening 10 may be disposed in one of two domains DM1 and DM2 that are adjacent to each other while sharing one side thereof, and a second opening 20 may be substantially disposed in the other domain.

The first openings 10 that are arranged in the first domain direction MDR1 and the second openings 20 that are arranged in the first domain direction MDR1 may be alternately arranged in a direction that crosses the first domain direction MDR1. For example, the direction may perpendicularly cross the first domain direction MDR1. The first domain direction MDR1 may be oblique to the first direction DR1 and the second direction DR2, but the present invention is not limited thereto. For example, the first domain direction MDR1 may be, for example, the first direction DR1 or the second direction DR2.

At least one of the first substrate 211 and the second substrate 221 may be attached to a device that is applied to the lens panel 200, or may be omitted depending on a formation method.

The optical modulation layer 230 has switchable modes and can control a light path by adjusting a phase of transmitted light. For example, the optical modulation layer 230 may be a liquid crystal layer that includes anisotropic liquid crystal molecules 31. The liquid crystal molecules 31 may have positive dielectric anisotropy, but the present invention is not limited thereto. A thickness of the optical modulation layer 230, for example, a gap between the first electrode unit 210 and the second electrode unit 22 in a third direction DR3, may be, for example, about 3 micrometers to about 30 micrometers, but the present invention is not limited thereto.

A refractive index of the optical modulation layer 230 can vary depending on a difference between voltages applied to the first electrode 212 and the second electrode 222, thereby the optical modulation layer 230 can control a light path. The optical modulation layer 230 may operate in a plurality of modes that include a first mode and a second mode according to the voltage difference between the first electrode 212 and the second electrode 222.

Referring to FIG. 4, a first voltage difference may be applied between the first electrode 212 and the second electrode 222 in the first mode. The first voltage difference may be a minimum voltage difference (e.g., 0 V). In the first mode, an alignment direction of the liquid crystal molecules 31 in each domain DM, for example, a long axis of the liquid crystal molecules 31, may be a constant direction. For example, as shown in FIG. 4, the long axes of the liquid crystal molecules 31 may be arranged to be approximately parallel with a main plane of the first or second electrode unit 210 or 220 in the first mode. However, in the first mode, the long axes of the liquid crystal molecules 31 may be approximately perpendicular to the main plane of the first or second electrode unit 210 or 220.

A first alignment layer 11 may be disposed between the first electrode unit 210 and the optical modulation layer 230 and a second alignment layer 12 may be disposed between the second electrode unit 220 and the optical modulation layer 230 for alignment of the liquid crystal molecules 31. The alignment layers 11 and 12 may provide an alignment direction of the liquid crystal molecules 31. The alignment layers 11 and 12 according to an exemplary embodiment of the present invention may be horizontal alignment layers, but the present invention is not limited thereto. For example, the alignment layers 11 and 12 may be vertical alignment layers.

Referring to FIG. 5, in the second mode, when a predetermined voltage difference (e.g., about 3.5 V to about 4 V) is applied between the first electrode 212 and the second electrode 222, a primary electric field having a component of the third direction DR3 in the optical modulation layer 230 is formed such that the liquid crystal molecules 31 are rearranged. When the liquid crystal molecules 31 have positive dielectric anisotropy, the liquid crystal molecules 31 are rearranged and thus the long axes are arranged to be substantially parallel with a direction of the electric field. In each domain DM, the liquid crystal molecules 31 are inclined in a specific direction by a fringe field between first electrodes 212 and second electrodes 222 at the periphery of edges of the first opening 10 or a fringe field between second electrodes 222 and first electrodes 212 at the periphery of edges of the second opening 20. The liquid crystal molecules 31 in each domain DM are inclined at different angles depending on locations in the domain DM. Accordingly, the optical modulation layer 230 forms a refractive index distribution that changes depending on locations in one domain DM such that light may experience a phase delay that is changed depending on locations in the domain DM. For example, liquid crystal molecules 31 disposed around the center of the domain DM are arranged to be substantially parallel with the main plane of the first electrode unit 210 or the second electrode unit 220, and liquid crystal molecules 31 disposed around edges of the domain DM may be inclined substantially toward the center of the domain DM. An inclination angle of the liquid crystal molecules 31 may be gradually increased toward the edges of the domain DM with reference to the main plane of the first electrode unit 210 or the second electrode unit 220.

Thus, an arrangement format of the liquid crystal molecules 31 in each domain DM is approximately similar to a convex lens, and the optical modulation layer 230 of each domain DM forms lenses ML that can control a light path.

Unlike a lenticular lens, each lens ML may be provided as a microlens that can refract light with viewing angles in all directions, and the lens panel 200 forms a lens array.

In a plan view, the lenses ML may be formed in areas that correspond to the first and second openings 10 and 20. Each lens ML may correspond to the first unit circle UC1 or the second unit circle UC2. Referring to FIG. 1, since the first openings 10 or the second openings 20 are disposed throughout the entire area of the lens panel 200, the lenses ML may be formed throughout the entire area of the lens panel 200.

The lens ML formed by the optical modulation layer 230 in the second mode may include a first lens ML1 and a second lens ML2 depending on whether the openings 10 and 20 are disposed in the first electrode 212 or in the second electrode 222. The first lens ML1 may be convex toward the second electrode unit 220 due to the arrangement format of the liquid crystal molecules 31, and the second lens ML2 may be convex toward the first electrode unit 210 due to the arrangement format of the liquid crystal molecules 31. As described, in one sectional view, the first lens ML1 and the second lens ML2 are viewed to be different in shape, and accordingly the first lens ML1 and the second lens ML2 will be described to be different from each other in shape. The first lens ML1 may be substantially similar to the second lens ML2 in shape by overturning the first lens ML1. Since the first opening 10 and the second opening 20 are overlapped with each other in their edge portions, the first lens ML1 and the second lens ML2 are also overlapped with each other in their edge portions. Areas where the first lens ML1 and the second lens ML2 overlap may be substantially the same as areas where the first opening 10 and the second opening 20 overlap.

Referring to FIG. 5, when the first opening 10 and the second opening 20 are each respectively disposed in one of two domains DM1 and DM2 that are adjacent to each other, the first lens ML1 and the second lens ML2 are each respectively formed in one of the two domains DM1 and DM2 may be adjacent to each other while interposing a domain boundary DML, which is a boundary between the two adjacent domains DM. Since the first lens ML1 and the second lens ML2, each having a different shape, are adjacent to each other, the liquid crystal molecules 31 that are disposed at the periphery (e.g., a boundary portion of the lenses ML1 and ML2) of the domain boundary DML are arranged in a substantially constant direction, thereby preventing or minimizing an occurrence of disclination, which may be caused by an irregular arrangement of liquid crystal molecules 31. Thus, a maximum plane area of the area where the lens ML is formed in each domain DM may be assured. Accordingly, a fill factor based on a ratio of an area on the plane of each domain DM to an area on the plane of the lens ML may be increased, thereby increasing the quality of a lens panel.

Since the first opening 10 and the second opening 20 are respectively disposed in the different electrodes 212 and 222, edges of the two openings 10 and 20 may be formed to be overlapped with each other, and accordingly, high-resolution lenses can be formed by reducing a pitch of the lenses ML1 and ML2. Further, in a plan view, the first openings 10 and the second openings 20 are disposed throughout the entire area of the lens panel 200 (e.g., there is no area where the first opening 10 or the second opening 20 is not disposed in a plan view) and the lens ML is formed in an area corresponding to the openings 10 and 20, and accordingly, a fill factor of substantially 100% can be acquired. For example, all areas of the lens panel 200 can be filled with the lenses ML.

Although the fill factor can be increased by overlapping the edge portions of the first opening 10 and the second opening 20, the first electrode 212 and the second electrode 222 are disposed apart from each other in a plan view. Thus, a direction of an electric field may be close to the first direction DR1, which is a plane direction, rather than to a thickness direction (e.g., the third direction DR3) of the lens panel 200 in an area (hereinafter referred to as a boundary portion) where the first lens ML1 and the second lens ML2 overlap in the second mode. The boundary portion is substantially close to the domain boundary DML. Then, a difference between a refractive index at the boundary portion of the lenses ML1 and ML2 and a refractive index at the center of the lenses ML1 and ML2 may be reduced so that a lens having a predetermined refractive index distribution might not be easily formed. For example, to acquire a parabolic refractive index distribution such that the refractive index is decreased toward the boundary portion from the center of the lenses ML1 and ML2, it may be desirable that a direction of long axes of the liquid crystal molecules 31 having positive dielectric anisotropy is substantially close to the third direction DR3. For this, the electric field needs to be formed in a direction that is as close to the third direction DR3 as possible, and the electric field might not be formed in the third direction DR3 due to a fringe field of the first electrode 212 and the second electrode 222. Hereinafter, exemplary embodiments of the present invention regarding a refractive index in the boundary portion of the lenses ML1 and ML2 will be described with reference to FIG. 6 to FIG. 8.

Figure 6:
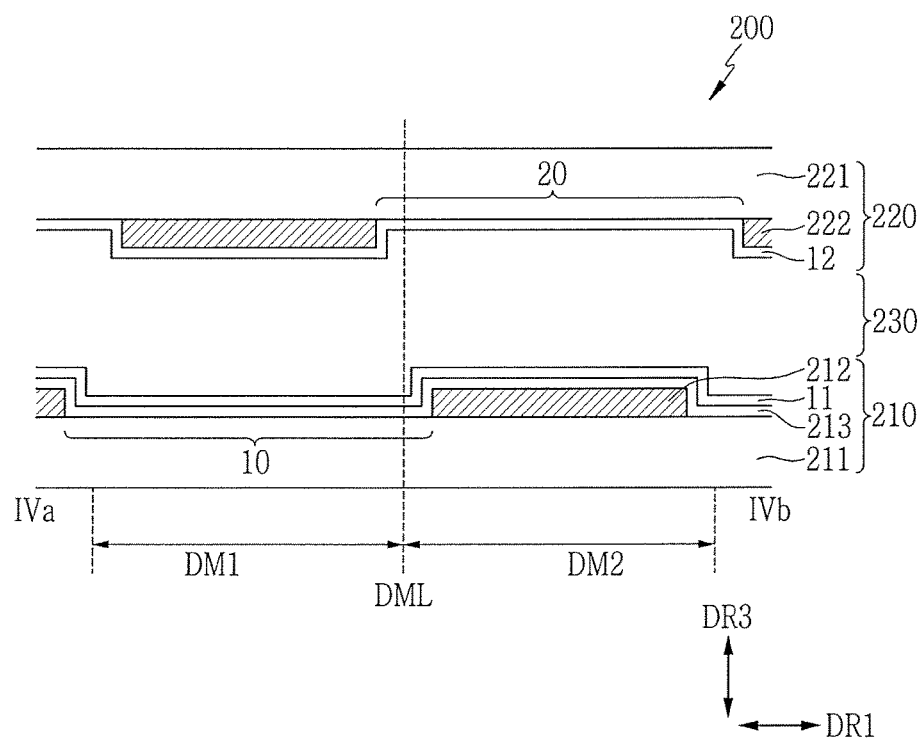
FIG. 6, FIG. 7, and FIG. 8 are diagrams illustrating lens panels of FIG. 1, taken along the line IVa-IVb, according to an exemplary embodiment of the present invention.
Figure 7:
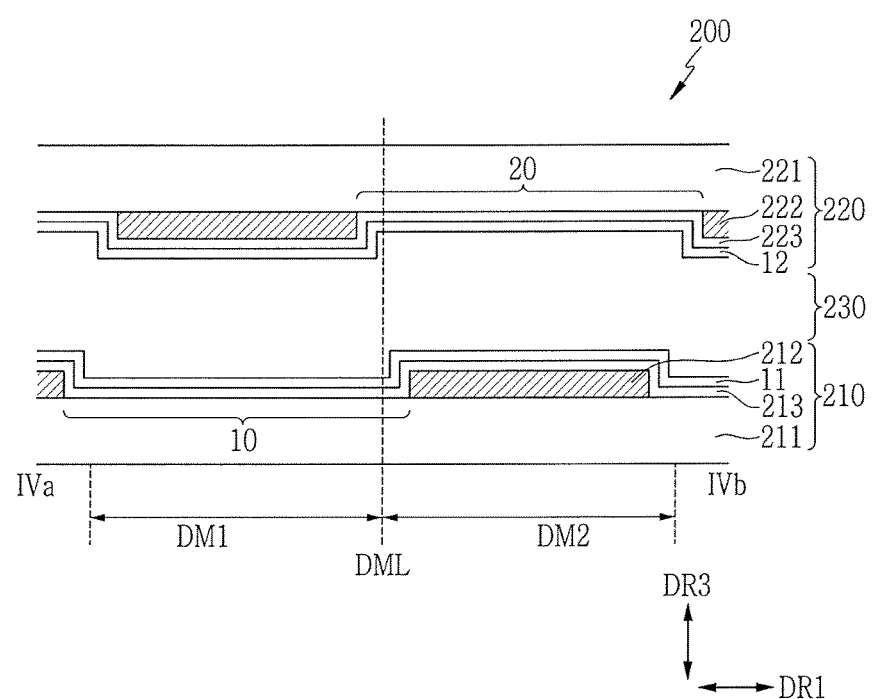
Figure 8:
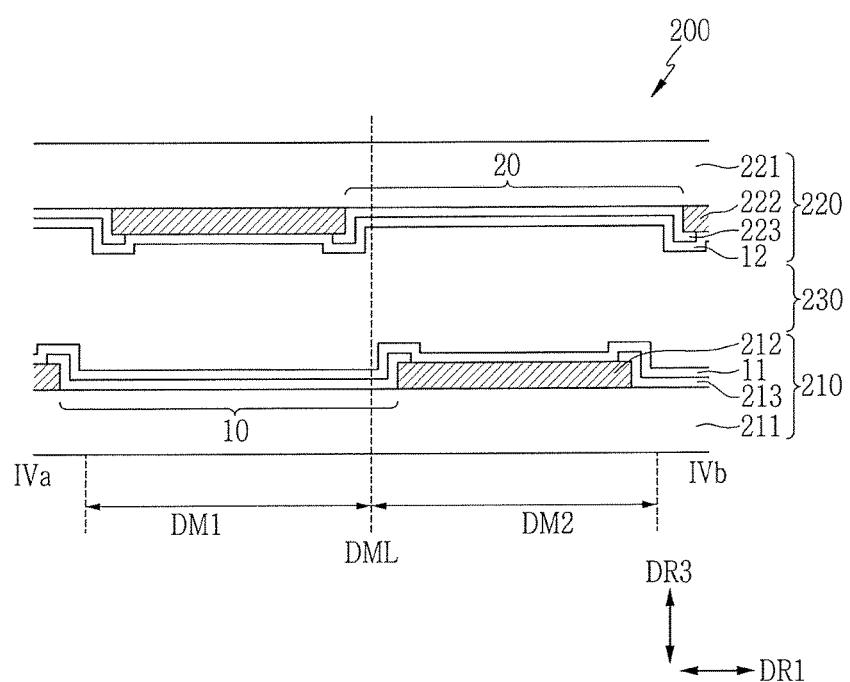

FIG. 6, FIG. 7, and FIG. 8 are cross-sectional views of exemplary embodiments of the present invention of the lens panels 200 of FIG. 1, taken along the line IVa-IVb, according to an exemplary embodiment of the present invention.

Referring to FIG. 6, the first electrode unit 210 includes a first resistive layer 213 between the first substrate 211 and the first alignment layer 11. The first resistive layer 213 wholly covers the first electrode 212. The first resistive layer 213 is a high-resistive layer having a high sheet resistance of, for example, about 1 MΩ/☐ or more or about 1 MΩ/☐ to about 1 GΩ/☐. As in the present exemplary embodiment, when the high-resistive layer 213 covers the edge portions of the first electrode 212, a fringe field of the first electrode 212 becomes weak so that the direction of the electric field in the boundary portion of the lens ML1 and ML2 can be closer to the third direction DR3. Accordingly, the liquid crystal molecules 31 at the boundary portion of the lens ML1 and ML2 can be effectively controlled, thereby increasing display quality, and the refractive index distribution of the lens ML1 and ML2 can be set to be closer to the shape of a parabola. In addition, since the fringe field is weakened, the liquid crystal molecules 31 may have an incline in a substantially constant direction at the boundary portion of the lens ML1 and ML2, and accordingly, occurrence of disclination can be prevented or minimized.

The high-resistive layer may be made of a material such as an indium-gallium-zinc oxide (IGZO), an indium-zinc-oxide (IZO), an indium-tin-oxide (ITO), and the like, but the present invention is not limited thereto. The high-resistive layer may have a thickness of, for example, about 10 nanometers or more or about 10 nanometers to about 100 nanometers, but the present invention is not limited thereto.

Referring to FIG. 7, like the exemplary embodiment of FIG. 6, the first electrode unit 210 includes a first resistive layer 213 disposed between the first substrate 211 and the first alignment layer 11, and the first resistive layer 213 covers the first electrode 212. In addition, the second electrode unit 220 includes a second resistive layer 223 between the second substrate 221 and the second alignment layer 12, and the second resistive layer 223 covers the second electrode 222. Like the first resistive layer 213, the second resistive layer 223 is a high-resistive layer, and may have high sheet resistance of, for example, about 1 MΩ/☐ or more or about 1 MΩ/☐ to about 1 GΩ/☐. Since the high-resistive first resistive layer 213 and the high-resistive second resistive layer 223 cover an edge of the first electrode 212 and an edge of the second electrode 222, fringe fields of the first electrode 212 and the second electrode 222 may be weakened and a direction of the electrical field at the boundary portion of the lenses ML1 and ML2 can be formed to be closer to the third direction DR3, and occurrence of disclination can be prevented.

Referring to FIG. 8, like the exemplary embodiment of FIG. 7, the first electrode unit 210 includes a first resistive layer 213 that covers the first electrode 212 and a second resistive layer 223 that covers the second electrode 222. However, the first resistive layer 213 covers only an edge of the first electrode 212 that is adjacent to the first opening 10 rather than wholly covering the first electrode 212, and the second resistive layer 223 covers only an edge of the second electrode 222 that is adjacent to the second opening 20 rather than wholly covering the second electrode 222. Even when the edges of the first and second electrodes 212 and 222 are covered, fringe fields of the electrodes 212 and 222 are weakened, and accordingly, the quality of the refractive index at the above-stated lens boundary portion may be increased and disclination can be prevented from occurring.

As in exemplary embodiments of FIG. 6 and FIG. 7, intensity of an electric field may be weakened overall when the resistive layers 213 and 223 wholly cover the electrodes 212 and 222, and therefore a higher voltage difference needs to be applied between the first electrode 212 and the second electrode 222 so as to acquire a predetermined refractive index distribution. According to an exemplary embodiment of FIG. 8, the resistive layers 213 and 223 partially cover the electrodes 212 and 222, so that an intensity of the electric field may be weakened, and accordingly an increase of power consumption due to application of the high-resistive layers (e.g., 213 and 223) can be minimized. However, a patterning process such as photolithography may be additionally performed because the resistive layers 213 and 223 need to be formed only in a predetermined area rather than in the entire area of the resistive layers 213 and 223. Unlike an exemplary embodiment of FIG. 8, one of the first resistive layer 213 and the second resistive layer 223 may be formed to wholly cover the first electrode 212 or the second electrode 222.

A difference in alignments of openings 10 and 20 between the above-described exemplary embodiments and exemplary embodiments to be described hereinafter will be mainly described, and a structure in a sectional view may be substantially the same as the structure shown in FIG. 4 and FIG. 5, and therefore, the structure might not be further described.

Figure 9:
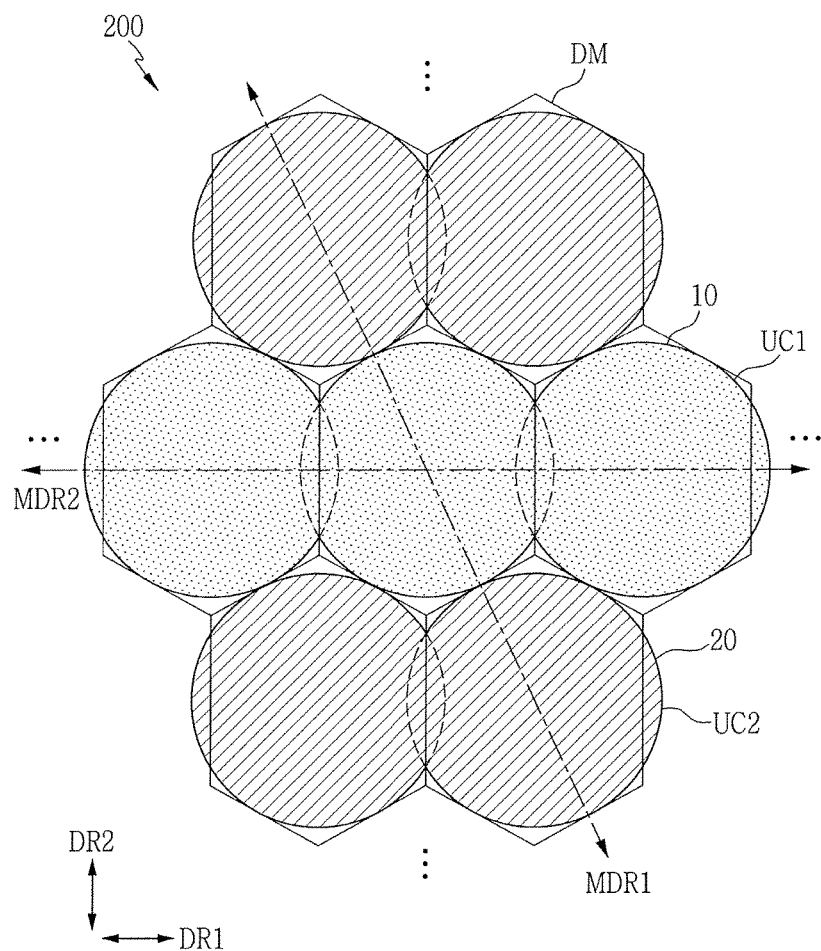
FIG. 9, FIG. 10, and FIG. 11 are top plan views illustrating lens panels according to exemplary embodiments of the present invention.
Figure 10:
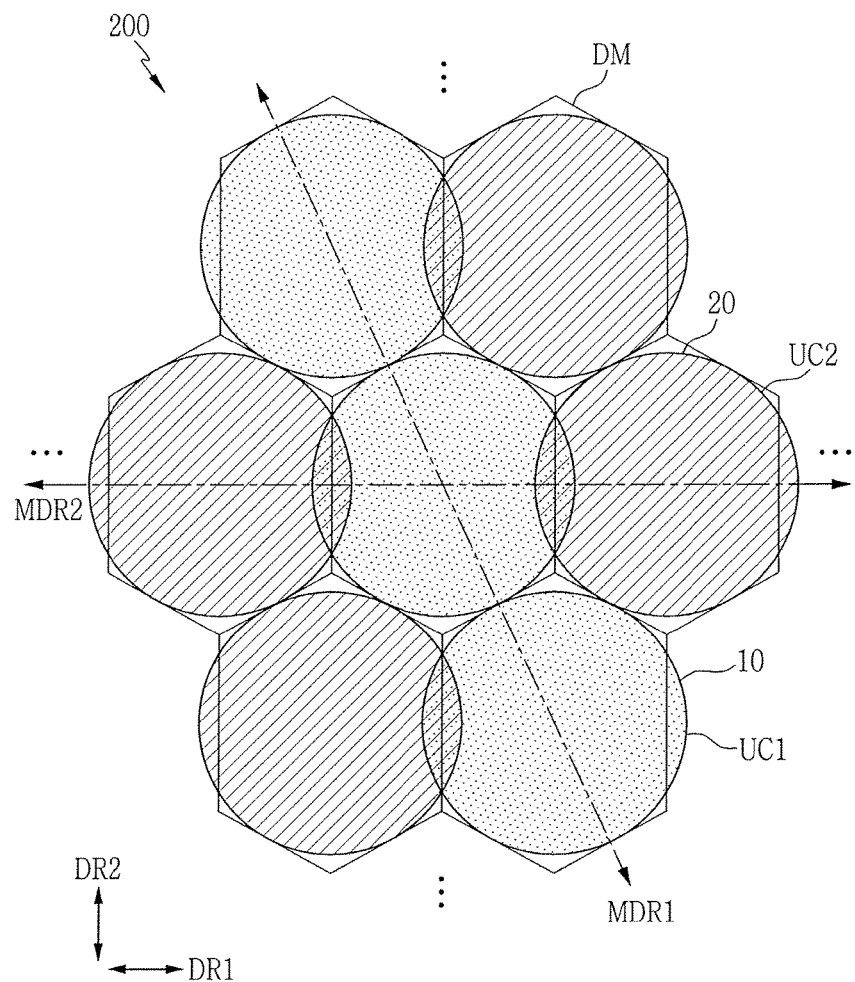
Figure 11:
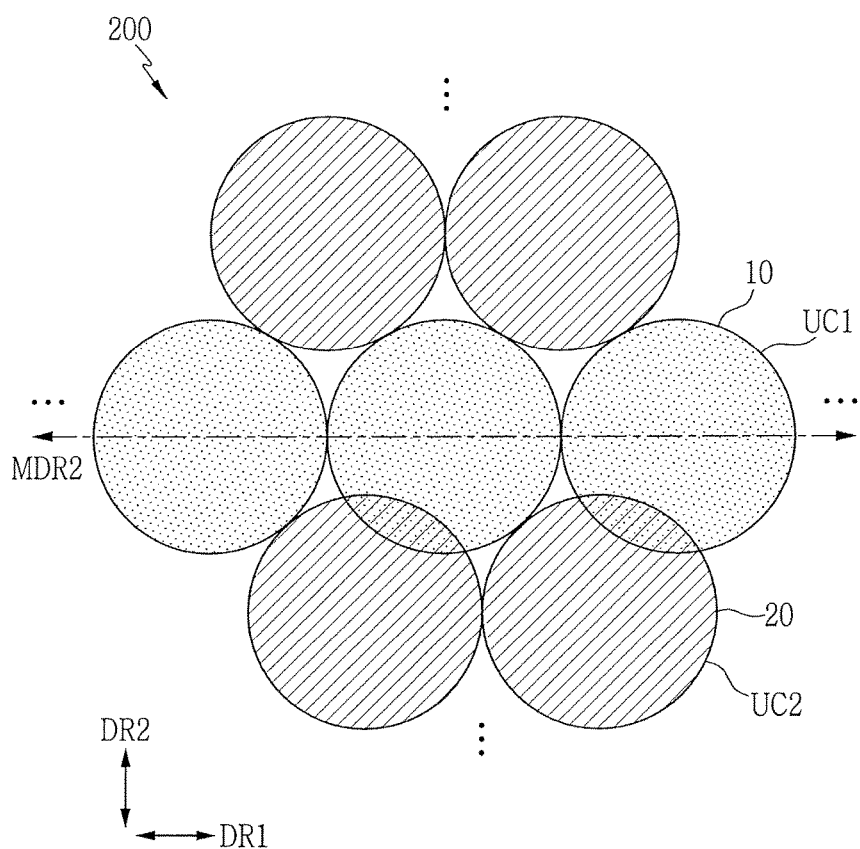

FIG. 9, FIG. 10, and FIG. 11 are top plan views illustrating lens panels 200 according to exemplary embodiments of the present invention.

Referring to FIG. 9, a lens panel 200 includes first openings 10 formed in a first electrode and second openings 20 formed in a second electrode. Each first opening 10 has a shape that is limited by first unit circles UC1 that overlap each other, and each second opening 20 has a shape that is limited by second unit circles UC2 that overlap each other. As shown in FIG. 9, the first opening 10 and the second opening 20 may be approximately formed in a second domain direction MDR2, and the first openings 10 and the second openings 20 may be alternately arranged in a first domain direction MDR1. However, unlike those illustrated in FIG. 9, the first openings 10 and the second openings 20 may be formed in a direction that is different from the second domain direction MDR2. For example, the first openings 10 and the second openings 20 may be arranged in the first domain direction MDR1. Each domain DM may have a shape like a hexagon as illustrated, but the present invention is not limited thereto. For example, the shape of the domain DM may be a polygon, a circle, or an oval, or may be atypical.

Unlike what is shown in FIG. 1 where the edge portion of the first opening 10 and the edge portion of the second opening 20 overlap each other, the first opening 10 and the second opening 20 contact each other rather than overlap each other. The first opening 10 and the second opening 20 may be disposed apart from each other by a predetermined gap. As described, when the first openings 10 and second openings 20 are formed, a fill factor may be increased due to an area where the first opening 10 and the second opening 20 are not disposed, but liquid crystal molecules in the area where neither the first opening 10 nor the second opening 20 exist can be more effectively controlled. This is because a first electrode and/or a second electrode are provided in such an area. Accordingly, a refractive index distribution of a lens in a direction that is different from the second domain direction MDR2 may correspond to the shape of a parabola.

Referring to FIG. 10, a lens panel 200 includes first openings 10 formed in a first electrode and second openings 20 formed in a second electrode. Each first opening 10 has a shape that is limited by first unit circles UC1, and each second opening 20 has a shape that is limited by second unit circles UC2. However, unlike the above-stated exemplary embodiments of the present invention, the first unit circles UC1 are not overlapped with each other and the second unit circles UC2 are not overlapped with each other. Thus, each first unit circle UC1 limits one first opening 10 and each second unit circle UC2 limits one second opening 20. Adjacent first openings 10 are arranged in a first domain direction MDR1, and adjacent second openings 20 are also arranged in the first domain direction MDR1. The first openings 10 and the second openings 20 may be alternately arranged in a second domain direction MRD2. Unlike those illustrated in FIG. 10, the adjacent first openings 10 and the adjacent second openings 20 may be arranged in a direction that is different from the first domain direction MDR1. For example, the adjacent first openings 10 and the adjacent second openings 20 may be arranged in the second domain direction MRD2.

In an exemplary embodiment of FIG. 10, edges of the first openings 10 and edges of the second openings 20 are overlapped with each other. Thus, the entire arrangement of lenses and a fill factor may be similar to those of an exemplary embodiment of FIG. 9. However, the first openings 10 and the second openings 20 are alternately arranged in the second domain direction MDR2 and lenses having different component configurations may be formed adjacent to each other. Accordingly, an occurrence of disclination can be minimized. In addition, a refractive index distribution of a lens in a direction that is different from the second domain direction MDR2 may correspond to the shape of a parabola.

Referring to FIG. 11, similar to an exemplary embodiment of FIG. 10, a single first unit circle UC1 limits one first opening 10 and a single second unit circle UC2 limits one second opening 20. However, only one edge of each first opening 10 overlaps an edge of each second opening 20, unlike an exemplary embodiment of FIG. 10 where opposite edges of each first opening 10 overlap edges of the second openings 20. According to an exemplary embodiment of the present invention, an area where the openings 10 and 20 do not exist is increased and thus a fill factor may be increased, but liquid crystal molecules in such an area can be more effectively controlled, thereby increasing a refractive index distribution of lenses.

The resistive layers 213 and 223 according to exemplary embodiments, of the present invention, of FIG. 6 to FIG. 8 may be selectively applied to exemplary embodiments, of the present invention, of FIG. 9 to FIG. 11.

Hereinafter, a display device that includes a lens panel 200 according to an exemplary embodiment of the present invention will be described with reference to FIG. 12 to FIG. 16, together with the above-described drawings.

Figure 12:
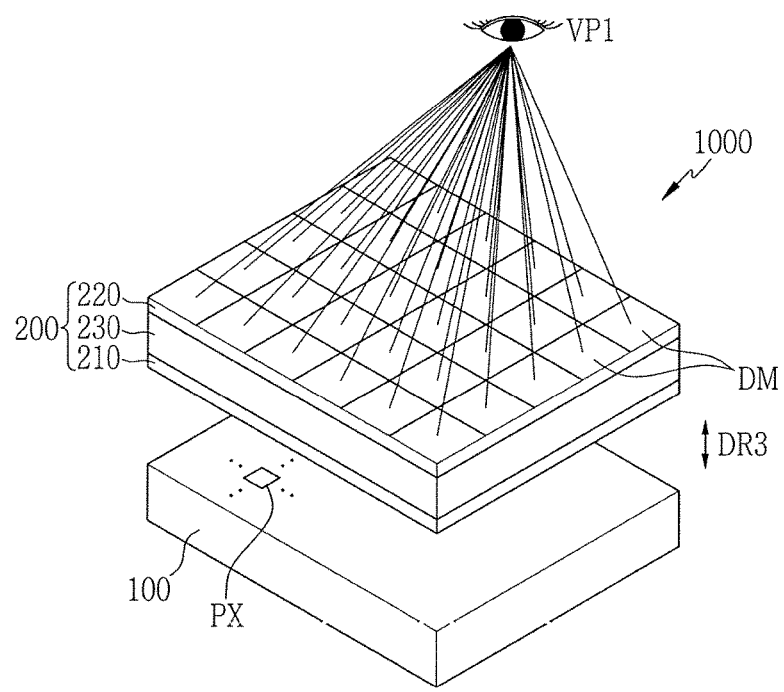
FIG. 12 is a schematic diagram illustrating a method for a display device that includes a lens panel to display an image in one viewpoint area according to an exemplary embodiment of the present invention.

Referring to FIG. 12, a display device 1000 according to an exemplary embodiment of the present invention includes a display panel 100 and a lens panel 200. The lens panel 200 may be disposed on the display panel 100. For example, the lens panel 200 may be disposed adjacent to a screen of the display panel 100. A structure of the lens panel 200 is almost the same as that of the lens panel 200 of the above-described exemplary embodiments of the present invention, and therefore no further detailed description may be provided.

The display panel 100 includes pixels PX that can display an image, and may transmit light of an image toward the lens panel 200. In case of a high resolution display panel 100, a resolution of the pixels PX may be, for example, about 2250 pixels per inch (ppi), but the present invention is not limited thereto. In FIG. 12, a first electrode unit 210 of the lens panel 200 is disposed close to the display panel 100 and the second electrode unit 220 is disposed above the first electrode unit 210 with the optical modulation layer 230 disposed therebetween. However, the present invention is not limited thereto. For example, a second electrode unit 220 may be disposed close to the display panel 100 and the first electrode unit 210 may be disposed above the second electrode unit 220 with the optical modulation layer 230 disposed therebetween.

The display device 1000 may be a liquid crystal display (LCD), an organic light emitting diode (OLED) display, or another type of display device. In a case of the liquid crystal display, the display device 1000 may further include a backlight that supplies light to the display panel 100.

Figure 13:
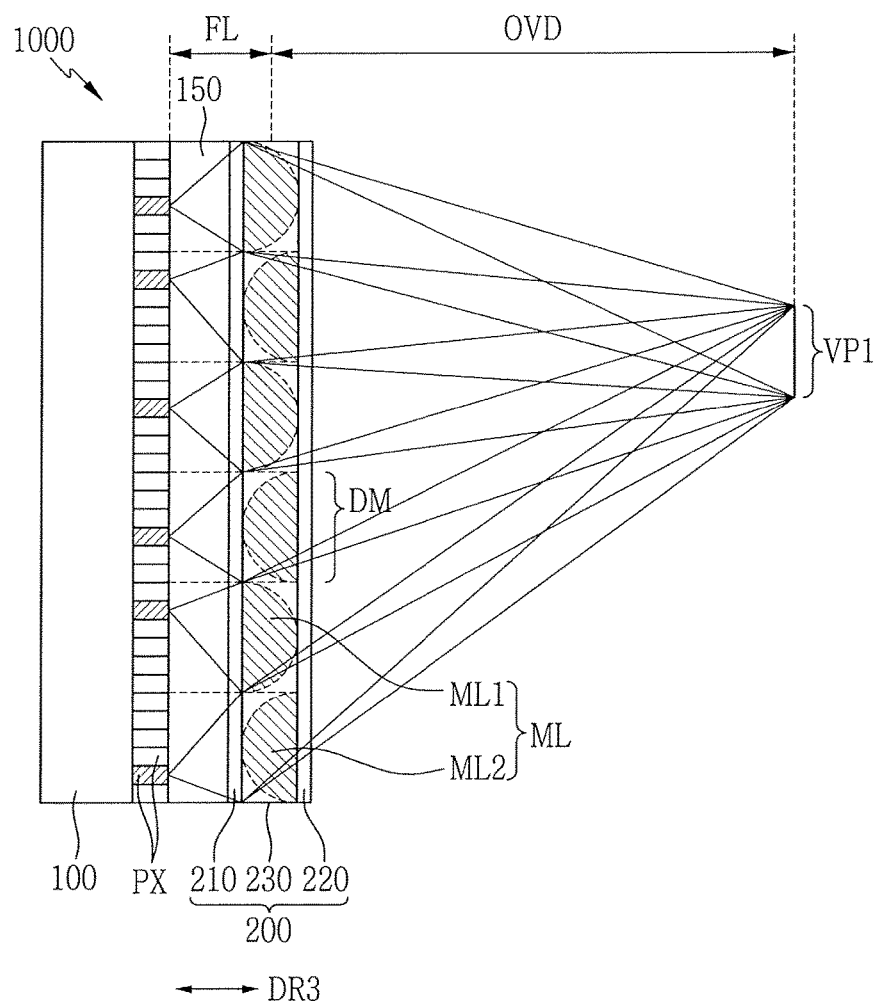
FIG. 13 is a schematic diagram illustrating a method for the display device that includes the lens panel to display an image in one viewpoint area from a cross-sectional view of the display device according to an exemplary embodiment of the present invention.
Figure 14:
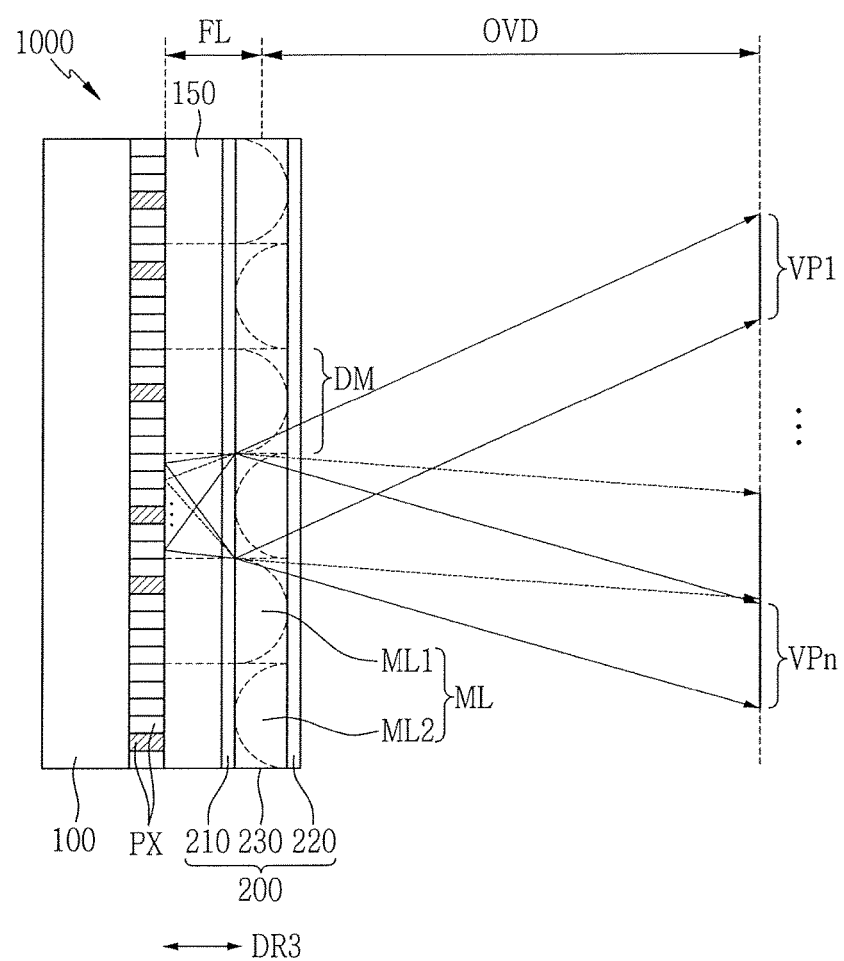
FIG. 14 is a schematic diagram illustrating a method for the display device that includes the lens panel to display an image in a plurality of viewpoint areas from a cross-sectional view of the display device according to an exemplary embodiment of the present invention.
Figure 15:
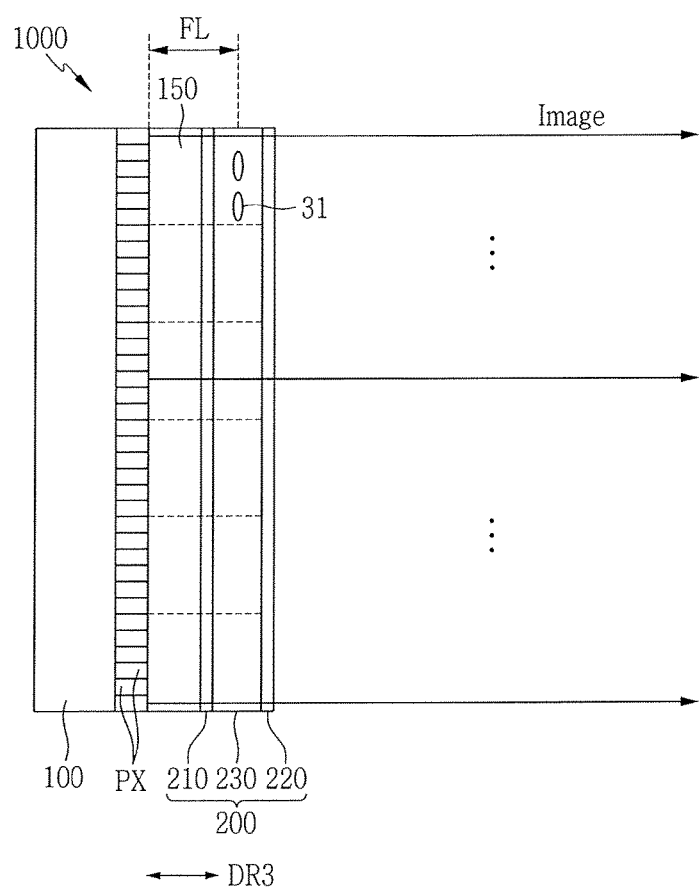
FIG. 15 schematically shows the method for the display device that includes the lens panel to display a 2D image from a cross-sectional view of the display device according to an exemplary embodiment of the present invention.

Referring to FIG. 13, FIG. 14, and FIG. 15, a transparent adhesive member 150 may be provided between the display panel 100 and the lens panel 200 to fix the display panel 100 and the lens panel 200 to each other. The adhesive member 150 may be, for example, an optical clear resin (OCR).

FIG. 12, FIG. 13, and FIG. 14 show an operation method of the display device 1000 in a 3D mode to view different images in a plurality of viewpoint areas VP1 to VPn. In the 3D mode, the lens panel 200 of the display device 1000 operates in the above-described second mode such that a lens array including lenses ML can be formed in the optical modulation layer 230. The lenses ML include first lenses ML1 and second lenses ML2 having opposite shapes as described above. As previously described, the display device 1000 can display different images in the plurality of viewpoint areas VP1 to VPn in the 3D mode, and accordingly, can be referred to as a multi-viewpoint display device.

Referring to FIG. 13 and FIG. 14, a distance between a screen where an image is displayed in the display panel 100 and a cross-sectional center of the lens ML formed in the lens panel 200 may be a focal distance FL of the lens ML. A distance between the cross-sectional center of the lens ML formed in the lens panel 200 and a point where an optimal stereoscopic image can be viewed is called an optimal viewing distance (OVD).

In a multi-view 3D mode, each pixel PX of the display panel 100 displays an image that corresponds to one of the plurality of viewpoint areas VP1 to VPn, and an image displayed by each pixel PX may be viewed in the corresponding viewpoint area through the lens panel 200 of the second mode. A left eye and a right eye of a viewer can recognize depth perception or a 3D effect by recognizing images of the different viewpoint areas VP1 to VPn.

Each domain of the lens panel 200 overlaps two or more pixels PX of the display panel 100 in a plan view, and light of images displayed by the pixels PX overlapped with each domain DM can transmit through the corresponding domain DM. Light from the pixels PX that correspond to each domain DM can be refracted to different directions depending on the locations of the pixels PX in the domain DM. For example, the pixels PX corresponding to each domain DM may display images corresponding to the different viewpoint areas VP1 to VPn, and pixels PX corresponding to each domain DM may display images that correspond to almost all the viewpoint areas VP1 to VPn.

Referring to FIG. 12 and FIG. 13, for example, among images of pixels PX emitting light incident on the domains DM, images of the pixels PX that correspond to the first viewpoint area VP1 transmit light through lenses ML of the domains DM and are thus viewed in the first viewpoint area VP1.

Referring to FIG. 14, images of pixels PX corresponding to one domain DM transmit respectively through different locations of lenses ML of the domain DM and then are refracted in different directions so that they can be viewed in the different viewpoint areas VP1 to VPn.

According to an exemplary embodiment of the present invention, a fill factor of the lenses ML formed by the lens panel 200 can be increased in the 3D mode and crosstalk in a 3D image viewed through the display device 1000 can be reduced, and accordingly a quality of the 3D image may be increased. In addition, as a resolution of the display panel 100 is increased, a resolution of the lens panel 200 may be increased, and according to the present exemplary embodiment, a lens pitch of the lens panel 200 can be reduced without reducing a fill factor of the lens ML, thereby readily implementing a high-resolution 3D image display device.

FIG. 15 shows an operation method of the display device 1000 in a 2D mode according to an exemplary embodiment of the present invention. In the 2D mode, the lens panel 200 operates in the above-described first mode, and thus the lenses ML are not formed in the optical modulation layer 230 and liquid crystal molecules 31 may be arranged in a constant direction. For example, in the 2D mode, the lens panel 200 is turned off so that an image displayed in the display panel 100 may be directly transmitted through the lens panel 200 and thus recognized as a 2D image.

Hereinafter, an alignment relationship between the lens panel 200 and the display panel 100 according to an exemplary embodiment of the present invention will be described with reference to FIG. 16, together with FIG. 12 to FIG. 15.

Figure 16:
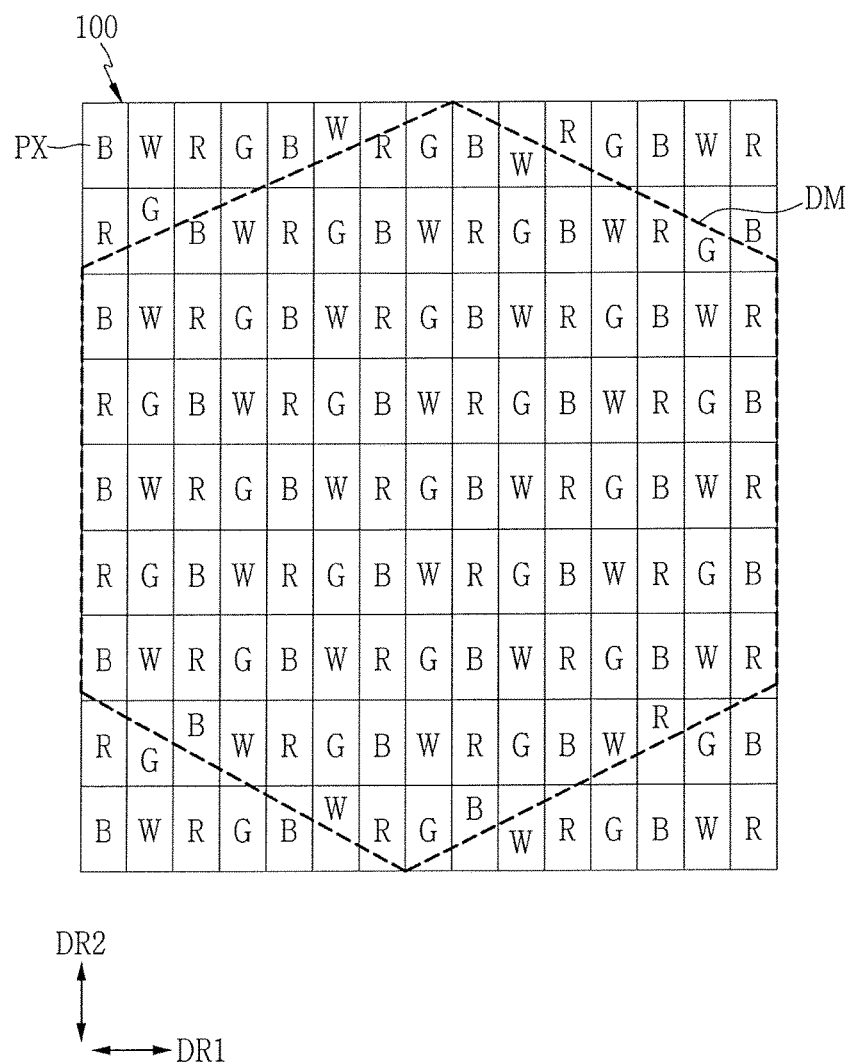
FIG. 16 is a top plan view illustrating the display device that includes the lens panel according to an exemplary embodiment of the present invention.

Referring to FIG. 16, one domain DM of the lens panel 200 according to an exemplary embodiment of the present invention may overlap two or more pixels PX of the display panel 100 in a plan view, and FIG. 16 illustrates, as an example, that each domain DM overlaps about 105 pixels PX. The pixels PX overlapping one domain DM may correspond to different viewpoint areas. Thus, in case of the present exemplary embodiment of FIG. 16, the display device can display an image by separating the image into about 105 viewpoint areas.

The pixels PX of the display panel 100 are arranged in rows and columns that are substantially parallel with the first direction DR1 and the second direction DR2 that is perpendicular to the first direction DR1, while forming a matrix format. Each pixel PX may emit light of one of a plurality of colors. A color that can be displayed by the pixel PX may be one of red R, green G, and blue B, but the present invention is not limited thereto. The domain DM may have various figures (e.g., shapes) other than the illustrated hexagon.

The lens panel according to exemplary embodiments of the present invention can be variously applied for the purpose of controlling a light path in various 3D display systems including the above-described display device.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
a display panel including a plurality of pixels configured to display an image; and
a lens panel disposed on the display panel and including a plurality of lenses when operating in a 3D mode,
wherein the lens panel is partitioned into a plurality of domains,
the lens panel comprises a first electrode, a second electrode, and an optical modulation layer, wherein the first electrode and the second electrode face each other and the optical modulation layer is disposed between the first electrode and the second electrode, wherein the optical modulation layer includes liquid crystal molecules forming the lenses,
the first electrode comprises first openings and the second electrode comprises second openings, and
at least one of a first opening, of the first openings, and a second opening, of the second openings, has a shape corresponding to a shape of a plurality of unit figures overlapping each other at their edges.

2. The display device of claim 1, wherein the first opening and the second opening overlap each other at their edges.

3. The display device of claim 1, wherein the first opening and the second opening do not overlap each other.

4. The display device of claim 1, wherein each of the plurality of unit figures has a circular shape.

5. The display device of claim 1, wherein each of the plurality of domains has a polygonal shape, and each of the plurality of domains is disposed in each of the plurality of unit figures.

6. The display device of claim 1, wherein each of the plurality of domains has a hexagonal shape.

7. The display device of claim 1, wherein the first openings are disposed in a first direction, and each of the first openings and each of the second openings are alternately arranged with respect to each other along a second direction that crosses the first direction.

8. The display device of claim 1, wherein the lens panel further comprises a first resistive layer that is disposed between the first electrode and the optical modulation layer.

9. The display device of claim 8, wherein the lens panel further comprises a second resistive layer that is disposed between the second electrode and the optical modulation layer.

10. The display device of claim 8, wherein the first resistive layer at least partially covers the first electrode.

11. A display device comprising:
a display panel comprising a plurality of pixels that are configured to display an image; and
a lens panel that is disposed on the display panel and comprises a plurality of lenses when operating in a 3D mode,
wherein the lens panel is partitioned into a plurality of domains,
and the lens panel comprises:
a first electrode including first openings;
a second electrode facing the first electrode and including second openings;
an optical modulation layer disposed between the first electrode and the second electrode and including liquid crystal molecules forming the lenses; and
a first resistive layer disposed between the first electrode and the optical modulation layer.

12. The display device of claim 11, wherein the lens panel further comprises a first alignment layer that is disposed between the first resistive layer and the optical modulation layer.

13. The display device of claim 11, wherein the lens panel further comprises a second resistive layer that is disposed between the second electrode and the optical modulation layer.

14. The display device of claim 13, wherein the lens panel further comprises a second alignment layer that is disposed between the second resistive layer and the optical modulation layer.

15. The display device of claim 11, wherein the first resistive layer at least partially covers the first electrode.

16. The display device of claim 11, wherein at least one of a first opening, of the first openings, and the second opening, of the second openings, has a shape corresponding to a shape of a plurality of unit figures overlapping each other at their edges.

17. The display device of claim 16, wherein the first openings and the second openings overlap each other at their edges.

18. The display device of claim 16, wherein the first openings and the second openings do not overlap each other.

19. The display device of claim 16, wherein each of the unit figures has a circular shape.

20. The display device of claim 16, wherein each of the domains has a polygonal shape and is disposed in each of the unit figures.

* * * * *